US011493388B2

United States Patent
Lee et al.

(10) Patent No.: US 11,493,388 B2
(45) Date of Patent: Nov. 8, 2022

(54) TEMPERATURE SENSOR USING DIGITAL DOUBLE SAMPLING

(71) Applicant: Himax Imaging Limited, Tainan (TW)

(72) Inventors: Sang Hyeon Lee, Tainan (TW); Hack soo Oh, Tainan (TW)

(73) Assignee: Himax Imaging Limited, Tainan (TW)

( * ) Notice: Subject to any disclaimer, the term of this patent is extended or adjusted under 35 U.S.C. 154(b) by 188 days.

(21) Appl. No.: 17/072,009

(22) Filed: Oct. 15, 2020

(65) Prior Publication Data

US 2022/0120620 A1 Apr. 21, 2022

(51) Int. Cl.
*G01K 1/14* (2021.01)
*G01K 15/00* (2006.01)
*G01K 7/01* (2006.01)

(52) U.S. Cl.
CPC ............... *G01K 1/14* (2013.01); *G01K 7/01* (2013.01); *G01K 15/005* (2013.01)

(58) Field of Classification Search
None
See application file for complete search history.

(56) References Cited

U.S. PATENT DOCUMENTS

| | | | | |
|---|---|---|---|---|
| 7,150,561 B1* | 12/2006 | D'Aquino | ............... | G01K 7/015 327/512 |
| 11,181,426 B1* | 11/2021 | Cullen | ................. | G01K 15/005 |
| 2003/0035463 A1* | 2/2003 | Breinlinger | ............... | G01K 7/01 257/467 |
| 2005/0068214 A1* | 3/2005 | Kim | .......................... | G01K 1/02 374/E1.002 |
| 2006/0093016 A1* | 5/2006 | McLeod | ................. | G01K 1/028 374/178 |
| 2008/0095213 A1* | 4/2008 | Lin | ......................... | G01K 7/015 374/170 |
| 2014/0084899 A1* | 3/2014 | Powell | ...................... | G01K 7/01 323/313 |
| 2016/0336947 A1* | 11/2016 | Ma | ........................... | G01K 7/21 |

FOREIGN PATENT DOCUMENTS

| CN | 107257948 A | * 10/2017 | ........... G01K 15/005 |
|---|---|---|---|
| CN | 104949767 B | * 7/2018 | ................ G01K 7/01 |
| JP | H0797048 B2 | * 10/1995 | |

* cited by examiner

*Primary Examiner* — Mirellys Jagan
(74) *Attorney, Agent, or Firm* — Winston Hsu

(57) ABSTRACT

An on-chip temperature sensor for generating a digital output signal representing a temperature value includes: a proportional to absolute temperature (PTAT) buffer for alternately generating a first voltage signal representing a first temperature of the PTAT buffer and a second voltage signal representing a second temperature of the PTAT buffer; an analog to digital (A/D) converter, coupled to the PTAT buffer, for converting the first voltage signal to a first digital voltage signal and for converting the second voltage signal to a second digital voltage signal; and a digital output generating block, for receiving the first digital voltage signal and the second digital voltage signal, and comparing a difference between the first digital voltage signal and the second digital voltage signal with a digital voltage reference signal to generate the digital output signal.

13 Claims, 3 Drawing Sheets

US 11,493,388 B2

TEMPERATURE SENSOR USING DIGITAL DOUBLE SAMPLING

BACKGROUND OF THE INVENTION

1. Field of the Invention

This invention relates to CMOS temperature sensors, and more particularly, to a CMOS temperature sensor which uses a single ended circuit to generate a digital reference temperature.

2. Description of the Prior Art

CMOS temperature sensors are usually on-chip devices. They combine a plurality of stages, as illustrated in FIG. 1. FIG. 1 is a diagram of a conventional CMOS temperature sensor 100, comprising a proportional to absolute temperature (PTAT) buffer 110, a band gap reference circuit 120 for generating a voltage reference signal Vref, an adder 130, an analog buffer 140, and an analog to digital (A/D) converter 150.

PTAT buffers can generate a voltage signal of the base to emitter voltage ($V_{BE}$) across a MOSFET within the PTAT buffer. By using MOSFETs with different bias to current densities, a voltage difference $\Delta V_{BE}$ can be generated, representing the difference between two differential nodes of the PTAT buffer. This voltage signal is proportional to temperature. By comparing it with a reference voltage signal which is independent of temperature, a signal representing a temperature of the CMOS can be generated.

As shown in FIG. 1, the PTAT buffer 110 generates a differential signal $+V_{BE}$, $-V_{BE}$, which are input to an adder 130. The adder 130 also receives the analog reference signal Vref generated by the band gap reference circuit 120. The differential signals can be written as $\Delta V_{BE}$. The adder 130 compares $\Delta V_{BE}$ with Vref, to generate resultant differential signals which are amplified by the analog buffer 140. The amplified differential signals are then sent to the A/D converter 150, which generates a digital signal Dout representing the temperature of the CMOS.

As illustrated above, the CMOS temperature sensor 100 is in the analog domain until the final output signal is generated. This means that differential signals and differential circuits are used, which require more power than single ended circuits.

Moreover, the band gap reference circuit 120 generates the reference voltage Vref by combining an absolute value of $V_{BE}$ with a voltage $V_{PTAT}$. Although Vref should be constant over temperature variation such that it is independent of temperature, when bipolar junction transistors (BJTs) are used to generate $V_{PTAT}$, variations in saturation current may lead the value of $V_{PTAT}$ to spread. Calibration of Vref can be performed to prevent this problem, but this involves tuning Vref in the analog domain, which occupies circuit area and also requires more power.

Therefore, there is a need for a CMOS temperature sensor which can solve the problems of the related art.

SUMMARY OF THE INVENTION

With this in mind, it is an objective of the present invention to provide an on-chip temperature sensor which utilizes single ended circuits, and wherein the reference voltage is in the digital domain.

An on-chip temperature sensor for generating a digital output signal representing a temperature value according to an exemplary embodiment of the present invention comprises: a proportional to absolute temperature (PTAT) buffer for alternately generating a first voltage signal representing a voltage across a first node of the PTAT buffer and a second voltage signal representing a voltage across a second node of the PTAT buffer; a gain stage, coupled to the PTAT buffer, for alternately receiving the first voltage signal and the second voltage signal, and amplifying the first voltage signal and the second voltage signal; an analog to digital (A/D) converter, coupled to the gain stage, for converting the amplified first voltage signal to a first digital voltage signal and for converting the amplified second voltage signal to a second digital voltage signal; and a digital output generating block, for receiving the first digital voltage signal and the second digital voltage signal, and comparing a difference between the first digital voltage signal and the second digital voltage signal with a digital voltage reference signal to generate the digital output signal.

The PTAT buffer comprises: a first bipolar junction transistor (BJT), coupled between ground and a reference current generated by a band gap circuit; a second BJT, coupled between the reference current and ground; a first switch, coupled between the reference current and the first BJT, wherein when the first switch is closed, the PTAT buffer outputs the first voltage signal; and a second switch, coupled between the reference current and the second BJT, wherein when the second switch is closed, the PTAT buffer outputs the second voltage signal. The first BJT and the second BJT are PNP BJTs.

The digital output generating block comprises: a first adder, for receiving the first digital voltage signal and the second digital voltage signal and generating the resultant digital signal; and a second adder, for adding the resultant digital signal to the digital voltage reference signal to generate the digital output signal. The digital voltage reference signal is generated using a one-time calibration mode. The PTAT buffer, the gain stage and the A/D converter are all single ended circuits.

A method for generating a digital output signal representing a temperature value of a Complementary Metal Oxide Semiconductor (CMOS) is also provided. The method comprises: alternately generating a first voltage signal representing a voltage across a first node and a second voltage signal representing a voltage across a second node; converting the first voltage signal to a first digital voltage signal and converting the second voltage signal to a second digital voltage signal; and comparing a difference between the first digital voltage signal and the second digital voltage signal with a digital voltage reference signal to generate the digital output signal.

Alternately generating the first voltage signal and the second voltage signal comprises: providing a first switch coupled to a first bipolar junction transistor (BJT); providing a second switch coupled to a second BJT; closing the first switch and opening the second switch to generate the first voltage signal corresponding to a voltage across the first BJT; and closing the second switch and opening the first switch to generate the second voltage signal corresponding to a voltage across the second BJT.

Comparing a difference between the first digital voltage signal and the second digital voltage signal with a digital voltage reference signal comprises: receiving the first digital voltage signal at a first time; receiving the second digital voltage signal at a second time; determining a difference between the first digital voltage signal and the second digital voltage signal to generate a resultant digital signal; and comparing the resultant digital signal with the digital voltage reference signal to generate the digital output signal.

Determining a difference between the first digital voltage signal and the second digital voltage signal comprises adding the first digital voltage signal and the second digital voltage signal to generate the resultant digital signal. Comparing the resultant digital signal with the digital voltage reference signal comprises adding the resultant digital signal to the digital voltage reference signal to generate the digital output signal.

The digital voltage reference signal is generated using a one-time calibration mode. The method further comprises amplifying the first voltage signal and the second voltage signal before they are respectively converted to the first digital voltage signal and the second digital voltage signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
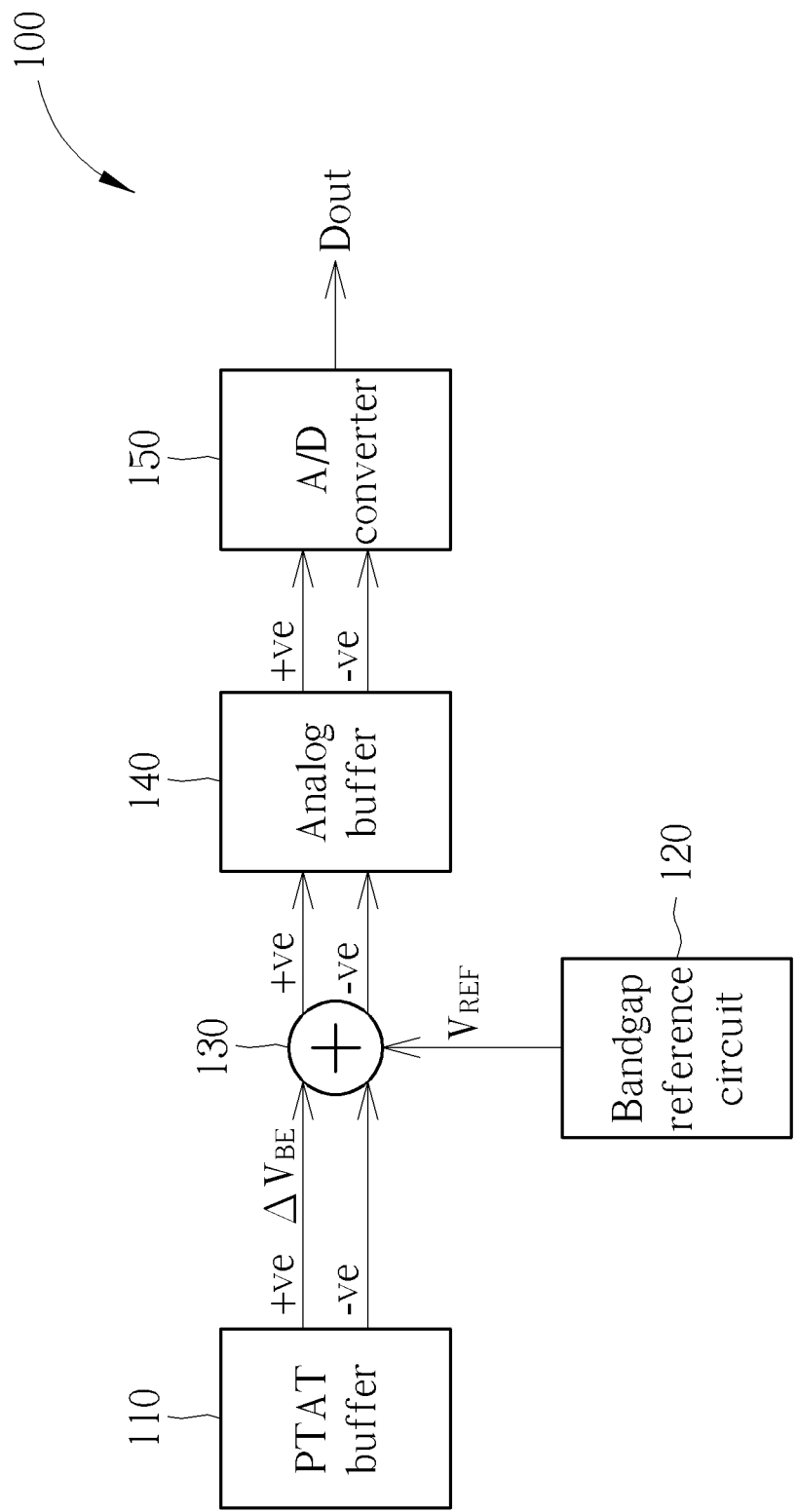
FIG. 1 is a diagram of a CMOS temperature sensor according to the related art.
Figure 2:
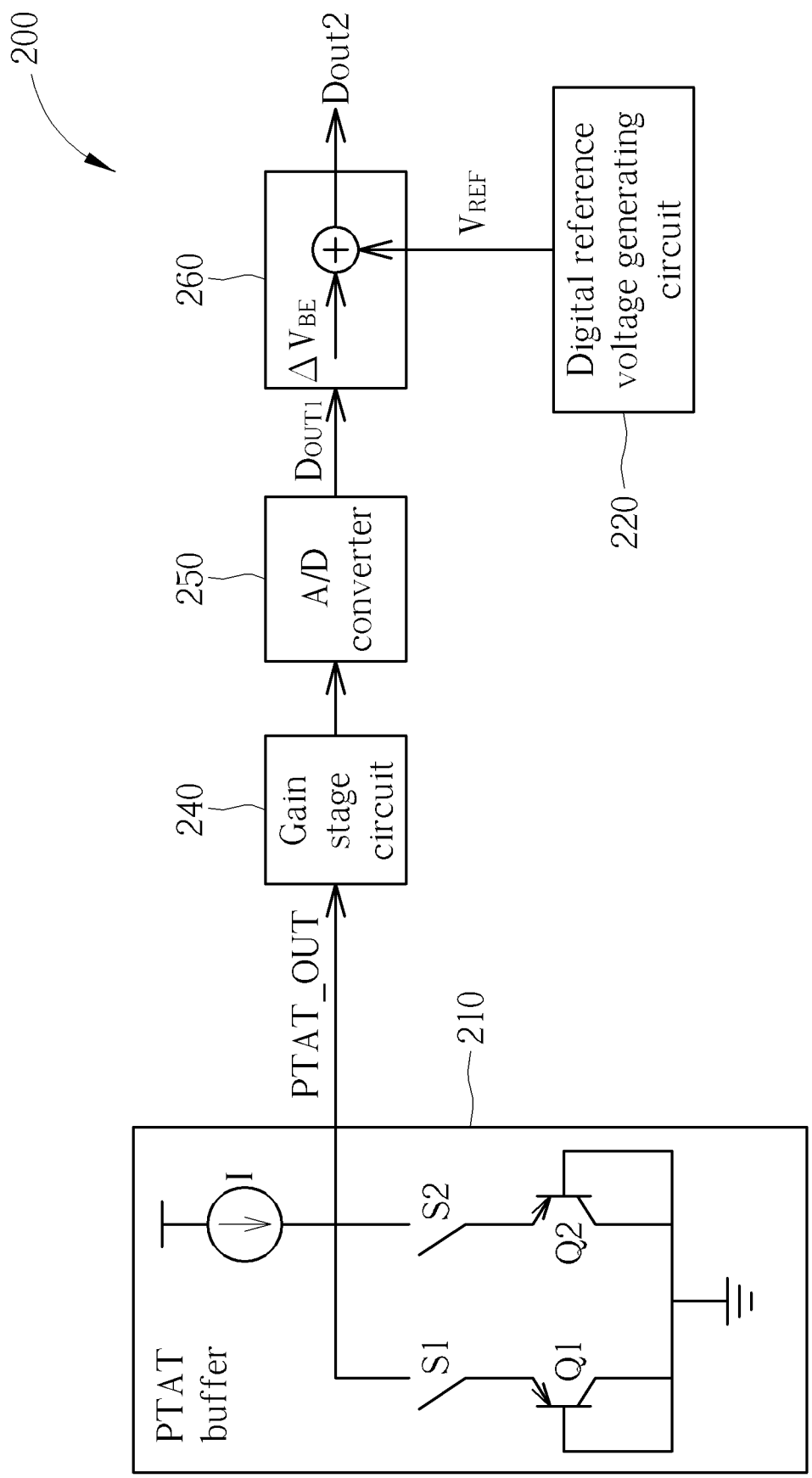
FIG. 2 is a diagram of a CMOS temperature sensor according to an exemplary embodiment of the present invention.

Refer to FIG. 2, which is a diagram of a CMOS temperature sensor 200 according to an exemplary embodiment of the present invention. As shown in the diagram, the CMOS sensor 200 comprises a PTAT block 210, a gain stage circuit 240, an A/D converter 250, a digital reference voltage generating circuit 220, and a digital output generation circuit 260. Compared to the CMOS sensor 100 illustrated in FIG. 1, the CMOS sensor 200 of the present invention uses single-ended circuits such that the differential signal does not need to be generated, which saves power. This will be detailed more fully in the following.

The CMOS sensor 200 of FIG. 2 uses switches to generate the base to emitter voltages $V_{BE}$. A first base to emitter voltage $V_{BE1}$ will be generated using a first switch, and then a second base to emitter voltage $V_{BE2}$ will be generated using a second switch. Both $V_{BE1}$ and $V_{BE2}$ are separately input to the digital signal generation block 260, wherein $V_{BE1}$ can be buffered and then added to $V_{BE2}$ in order to generate the signal $\Delta V_{BE}$.

By using this digital double sampling (DDS) method of generating the base to emitter voltages separately, and then determining $\Delta V_{BE}$ in the digital domain, the CMOS sensor 200 of the present invention can use single ended rather than differential circuits. This saves on both circuit area and power.

In order to also have the voltage reference signal Vref in the digital domain, Vref is generated using a digital reference voltage generating circuit 220. This solves the problem of using BJTs which have temperature variation when the BJT reaches its saturation current, and ensures Vref will be more accurate over a range of PVT variations.

As shown in FIG. 2, the PTAT buffer 210 comprises a first BJT Q1 coupled to a first switch S1, and a second BJT Q2 coupled to a second switch S2. The first BJT Q1 and the second BJT Q2 are coupled in parallel between ground and a reference current I. The reference current I is generated using a band gap circuit. When both the first switch S1 and the second switch S2 are open, no output signal is generated. When the first switch S1 is closed, an output signal PTAT_OUT representing the base to emitter voltage of the first BJT Q1 will be generated. Similarly, when the second switch S2 is closed, an output signal PTAT_OUT representing the base to emitter voltage of the second BJT Q2 will be generated. By alternately opening and closing the switches S1 and S2, the PTAT buffer 210 can generate two output signals PTAT_OUT respectively representing the base to emitter voltage of Q1 and Q2.

The output signal PTAT_OUT is sent to the gain stage circuit 240, where it will be amplified and sent to the A/D converter 250. The A/D converter outputs a digital signal $D_{OUT1}$ which will be input to the digital output generation circuit 260. Once the digital output generation circuit 260 has received digital signals corresponding to Q1 and Q2, the difference $\Delta V_{BE}$ can be determined and then compared with Vref in the digital domain to directly generate the output signal Dout2 which represents a temperature of the CMOS 200.

Figure 3:
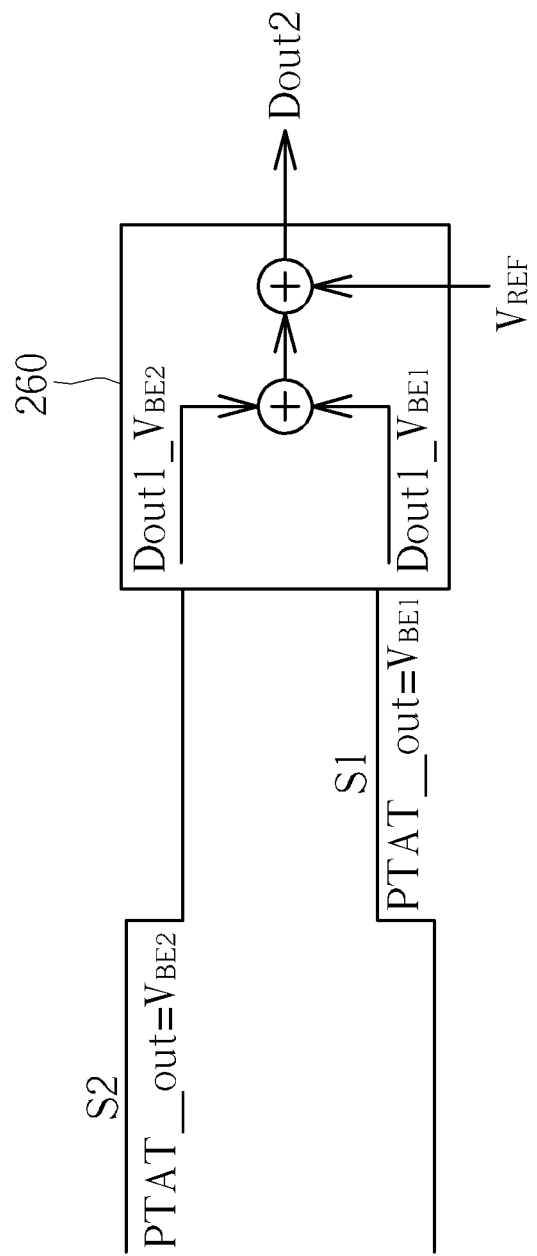
FIG. 3 is an operating flowchart of the circuit generation something shown in FIG. 2.

FIG. 3 illustrates an operation of the PTAT buffer 210 and the digital output generation circuit 260 shown in FIG. 2. As detailed above, the PTAT buffer 210 comprises two switches S1 and S2. When switch S2 is on (closed) and switch S1 is off (open), the output signal PTAT_OUT of the PTAT buffer 210 is $V_{BE2}$, which is a base to emitter voltage of the BJT Q2. This voltage will be sent to the gain stage circuit 240, amplified therein, sent to the A/D converter 250, and then output as a digital signal $D_{OUT1\_VBE2}$. When switch S2 is off (open) and switch S1 is on (closed), the output signal PTAT_OUT of the PTAT buffer 210 is $V_{BE1}$, which is a base to emitter voltage of the BJT Q1. This voltage will be sent to the gain stage circuit 240, amplified therein, sent to the A/D converter 250, and then output as a digital signal $D_{OUT1\_VBE1}$. Both $D_{OUT1\_VBE2}$ and $D_{OUT1\_VBE1}$ are received by the digital signal generating block 260.

Rather than first calculating $\Delta V_{BE}$ in the analog domain, and comparing $\Delta V_{BE}$ to an analog voltage reference signal, the digital signal generating block 260 uses an adder to find the difference between $D_{OUT1\_VBE2}$ and $D_{OUT1\_VBE1}$, which is equivalent to $\Delta V_{BE}$ and is a digital value. (In practice, this will be a subtraction). $\Delta V_{BE}$ is input to a second adder which also receives the digital voltage reference signal Vref. By comparing the two voltages, the final output $D_{OUT2}$ is generated.

By generating the voltage reference signal Vref in the digital domain, calibration can also be performed more easily, using a one-time calibration mode. This enables Vref to be determined in a single calibration stage, and avoids the temperature variation associated with saturation current in BJTs.

As the on-chip CMOS temperature sensor can be implemented using only single ended circuits, determination and generation of temperature can be performed requiring less complexity, power and circuit area than the differential analog domain circuit of the related art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An on-chip temperature sensor for generating a digital output signal representing a temperature value of a Complementary Metal Oxide Semiconductor (CMOS), comprising:
   a proportional to absolute temperature (PTAT) buffer for alternately generating a first voltage signal representing a voltage across a first node of the PTAT buffer and a second voltage signal representing a voltage across a second node of the PTAT buffer;
   an analog to digital (A/D) converter coupled to the PTAT buffer for converting the first voltage signal to a first digital voltage signal and for converting the second voltage signal to a second digital voltage signal; and
   a digital output generating block for receiving the first digital voltage signal and the second digital voltage signal, and comparing a difference between the first digital voltage signal and the second digital voltage signal with a digital voltage reference signal to generate the digital output signal;
   wherein the PTAT buffer and the A/D converter are both single-ended circuits.

2. The on-chip temperature sensor of claim 1, wherein the digital voltage reference signal is generated using a one-time calibration mode.

3. The on-chip temperature sensor of claim 1, further comprising a gain stage, coupled between the PTAT buffer and the A/D converter, for alternately receiving the first voltage signal and the second voltage signal, and amplifying the first voltage signal and the second voltage signal before they are input to the A/D converter.

4. The on-chip temperature sensor of claim 3, wherein the gain stage is a single ended circuit.

5. The on-chip temperature sensor of claim 1, wherein the PTAT buffer comprises:
   a first bipolar junction transistor (BJT) coupled between ground and a reference current generated by a band gap circuit;
   a second BJT coupled between the reference current and ground;
   a first switch coupled between the reference current and the first BJT, wherein when the first switch is closed, the PTAT buffer outputs the first voltage signal; and
   a second switch coupled between the reference current and the second BJT, wherein when the second switch is closed, the PTAT buffer outputs the second voltage signal.

6. The on-chip temperature sensor of claim 5, wherein the digital output generating block receives the first digital voltage signal at a first time, receives the second digital voltage signal at a second time, determines a difference between the first digital voltage signal and the second digital voltage signal to generate a resultant digital signal, and compares the resultant digital signal with the digital voltage reference signal to generate the digital output signal.

7. The on-chip temperature sensor of claim 6, wherein the first BJT and the second BJT are PNP BJTs, and the digital output generating block comprises:
   a first adder for receiving the first digital voltage signal and the second digital voltage signal and generating the resultant digital signal; and
   a second adder for adding the resultant digital signal to the digital voltage reference signal to generate the digital output signal.

8. A method for generating a digital output signal representing a temperature value of a Complementary Metal Oxide Semiconductor (CMOS), comprising:
   alternately generating a first voltage signal representing a voltage across a first node and a second voltage signal representing a voltage across a second node;
   converting the first voltage signal to a first digital voltage signal and converting the second voltage signal to a second digital voltage signal; and
   comparing a difference between the first digital voltage signal and the second digital voltage signal with a digital voltage reference signal to generate the digital output signal;
   wherein the first voltage signal and the second voltage signal are both single-ended signals.

9. The method of claim 8, wherein the digital voltage reference signal is generated using a one-time calibration mode.

10. The method of claim 8, further comprising:
    amplifying the first voltage signal and the second voltage signal before they are respectively converted to the first digital voltage signal and the second digital voltage signal.

11. The method of claim 8, wherein the step of alternately generating the first voltage signal and the second voltage signal comprises:
    providing a first switch coupled to a first bipolar junction transistor (BJT);
    providing a second switch coupled to a second BJT;
    closing the first switch and opening the second switch to generate the first voltage signal corresponding to a voltage across the first BJT; and
    closing the second switch and opening the first switch to generate the second voltage signal corresponding to a voltage across the second BJT.

12. The method of claim 11, wherein the step of comparing a difference between the first digital voltage signal and the second digital voltage signal with a digital voltage reference signal comprises:
    receiving the first digital voltage signal at a first time;
    receiving the second digital voltage signal at a second time;
    determining a difference between the first digital voltage signal and the second digital voltage signal to generate a resultant digital signal; and
    comparing the resultant digital signal with the digital voltage reference signal to generate the digital output signal.

13. The method of claim 12, wherein the step of determining a difference between the first digital voltage signal and the second digital voltage signal comprises:
    adding the first digital voltage signal and the second digital voltage signal to generate the resultant digital signal;
    and the step of comparing the resultant digital signal with the digital voltage reference signal comprises:
    adding the resultant digital signal to the digital voltage reference signal to generate the digital output signal.

* * * * *